United States Patent [19]

Gomi et al.

[11] Patent Number: 5,061,533
[45] Date of Patent: Oct. 29, 1991

[54] ROLL FORMED OF CARBON FIBER COMPOSITE MATERIAL

[75] Inventors: Takeo Gomi, Toyohashi; Hitoshi Kodama, Nagoya, both of Japan

[73] Assignee: Mitsubishi Rayon Company Ltd., Tokyo, Japan

[21] Appl. No.: 416,975

[22] Filed: Oct. 4, 1989

[30] Foreign Application Priority Data

Oct. 11, 1988 [JP] Japan .................................. 63-255389
Nov. 24, 1988 [JP] Japan .................................. 63-294745

[51] Int. Cl.$^5$ .......................................... B21B 31/08
[52] U.S. Cl. ..................................... 428/36.3; 29/130; 29/132; 428/110; 428/113
[58] Field of Search ................. 29/130, 132; 428/36.3, 428/113, 110

[56] References Cited

U.S. PATENT DOCUMENTS

| | | | |
|---|---|---|---|
| 3,165,179 | 1/1965 | Shapland | 29/130 |
| 4,368,568 | 1/1983 | Watanabe | 29/130 |
| 4,568,275 | 2/1986 | Sakurai | 29/130 |
| 4,586,224 | 5/1986 | Sartor | 29/132 |
| 4,664,644 | 5/1987 | Kumata et al. | 428/36.3 |

Primary Examiner—James J. Seidleck
Attorney, Agent, or Firm—Oblon, Spivak, McClelland, Maier & Neustadt

[57] ABSTRACT

A roll formed of a carbon fiber composite material having at least two different carbon fiber-winding angles, wherein the winding angle in the innermost layer is "75° to 90° to the axial direction and the winding angle in the outermost layer is 0° to ±35° to the axial direction.

11 Claims, 2 Drawing Sheets

ROLL FORMED OF CARBON FIBER COMPOSITE MATERIAL

BACKGROUND OF THE INVENTION

1. Field of the Invention

The present invention relates to a roll having a light weight and a high rigidity. More particularly, the present invention relates to a delivery roll, guide roll or printing roll for use during the processing of a film, foil, paper, cloth or the like.

2. Description of the Related Art

Rolls formed of steel or aluminum are widely used as delivery rolls for films, foils, papers, cloths and the like. Aluminum rolls are mainly used in this field because the specific gravity is small and the specific modulus is low, and rolls having a relatively light weight can be manufactured, but since the Young's modulus of aluminum is about 7000 kg/mm$^2$ and the specific gravity of aluminum is 2.7 g/cm$^3$, the specific modulus of aluminum is $2.59 \times 10^9$ mm. In contrast, in the case of rolls formed of carbon fiber composite materials (hereinafter referred to as "CFRP"), when a high-tenacity carbon fiber is used, the Young's modulus in the axial direction is 8000 to 10000 kg/mm$^2$, and when a highly elastic carbon fiber is used, the Young's modulus is 13000 to 16000 kg/mm$^2$, although these values differ to some extent according to the fiber lamination angle and the kind of resin used. The specific gravity of CFRP is as small as 1.5 to 1.6 g/cm$^3$, and accordingly, the specific modulus is (5 to 10)$\times 10^9$ mm, i.e., about 2 to about 4 times the specific modulus of aluminum.

Therefore, rolls utilizing the above-mentioned advantageous properties of CFRP have been proposed in, for example, GB2020699A, GM8406019, Japanese Examined Patent Publication No. 59-45843, and Japanese Unexamined Patent Publication No. 61-194197.

According to the teaching of Japanese Examined Patent Publication No. 59-45843, carbon fiber prepregs are arranged in the axial direction of a roll shell formed of an aluminum tube and bonded to the inner circumferential surface of the shell, whereby the entire weight of the roll is reduced and the rigidity is increased. Nevertheless, due to structural limitations, a satisfactory reduction of the weight or satisfactory improvement of the rigidity is difficult to obtain.

Japanese Unexamined Patent Publication No. 61-217566 teaches that a roll base is formed from a carbon fiber composite material and a surface treatment is carried out on this roll base to enable a metal flame spraying and metal deposition thereon. This technique is intended to reduce the weight, increase the rigidity, and maintain a high surface strength and hardness of the roll. Since the roll base is composed of the carbon fiber composite material having a high rigidity and a small specific gravity, the weight is sufficiently reduced, and since the surface is tightly covered with a metal, a roll having a high hardness is obtained. Nevertheless, although this roll is very advantageous in these points, the fiber lamination structure is not mentioned or taken into consideration in this proposal, and therefore, further investigations are required into the carbon fiber-winding structure.

More specifically, the carbon fiber has a highly anisotropic Young's modulus and linear expansion coefficient and therefore, if the lamination is based only on the manifestation of the Young's modulus, an unbalanced stress is produced in the interior of the lamination structure, and in an extreme case, cracking occurs. Further, a problem arises of the precision of a molded article, especially the linear precision after peripheral machining, and therefore, an appropriate lamination structure must be selected in view of these problems. Furthermore, molded articles are generally used after certain surface treatments have been conducted, and thus a problem arises of the compatibility with a surface-treating material, especially in connection with the linear expansion coefficient. Namely, in the case of a CFRP roll, it is necessary to specify the linear expansion coefficient in each direction at respective parts and determine a specific lamination method ensuring such linear expansion coefficients, although this need not be taken into consideration in the case of a metal roll.

SUMMARY OF THE INVENTION

Therefore, a primary object of the present invention is to provide a CFRP roll having a light weight and a high precision, which cannot be manufactured by any of the conventional techniques using metal or CFRP materials, and to determine the lamination structure and linear expansion coefficients of respective parts.

Another object of the present invention is to provide a roll formed of a carbon fiber composite material in which, by appropriately setting the winding angle of the carbon fiber and the lamination order, the Young's moduli in the axial and circumferential directions of the CFRP base tube are maintained at appropriate levels, the internal stress of the base tube in the radial direction is controlled so that a compressive stress always occurs, whereby interlaminar cracking or a generation of strain is controlled, and by making the linear expansion coefficient in the axial direction of the CFRP outer layer much smaller than the average linear expansion coefficient in the axial direction of other layers except the CFRP outer layer, the linear precision of the formed roll after the peripheral polishing is greatly improved.

Still another object of the present invention is to improve the conformability of the so-formed roll with a surface-treating material by appropriately setting the average linear expansion coefficient of the entire CFRP when the formed roll is subjected to a surface treatment, especially a ceramic flame spraying treatment or a metal plating treatment.

More specifically, in accordance with the present invention, there is provided a roll formed of a carbon fiber composite material having at least two different carbon fiber-winding angles, wherein the winding angle at the innermost layer is ±75° to 90° to the axial direction and the winding angle at the outermost layer is 0° to ±35° to the axial direction.

DESCRIPTION OF THE PREFERRED EMBODIMENTS

Figure 1:
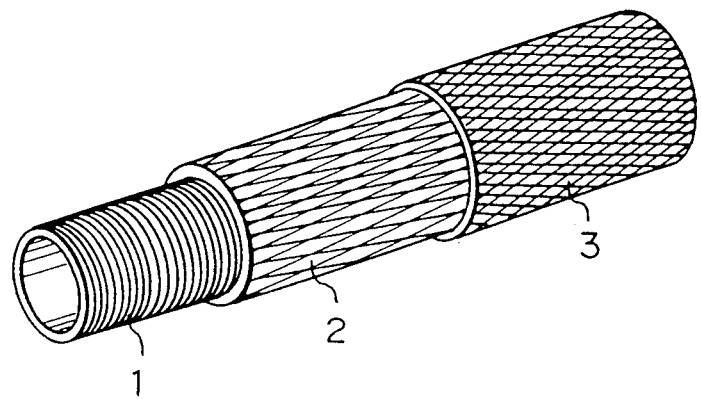
FIG. 1 is a diagram of the lamination structure of a base tube of a CFRP roll of the present invention, in which 1 represents an orientation angle of ±75° to 90° at the innermost layer, 2 indicates a winding angle equal to or close to the axial direction at the inner layer, and 3 represents the winding angle of ±20° at the outermost layer.
Figure 2:
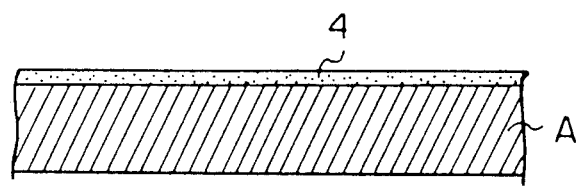
FIG. 2 shows a roll formed by plating and covering the base tube shown in FIG. 1 with a metal, in which A represents the CFRP base tube and 4 represents the metal plating layer.

The present invention will now be described in detail.

Table 1 shows the fiber orientation angle and the Young's modulus and linear expansion coefficient of the laminate, calculated with respect to Pyrofil® T-1, which is a carbon fiber supplied by Mitsubishi Rayon and having a strength of 360 kg/mm² and an elastic modulus of 24 ton/mm². The orientation angle is the angle of orientation of the fiber from the axial center, the Young's modulus is the value determined in the axial direction, and the linear expansion coefficient is the value determined in the circumferential direction.

TABLE 1

| Fiber Orientation Angle (°) | Young's Modulus $E_L$ (kg/mm²) | Linear Expansion Coefficient $\alpha_c$ (1/°C.) in Circumferential Direction |
|---|---|---|
| 0 | 14400 | $34.0 \times 10^{-6}$ |
| ±10 | 13200 | $32.3 \times 10^{-6}$ |
| ±20 | 9210 | $28 \times 10^{-6}$ |
| ±30 | 4550 | $19.7 \times 10^{-6}$ |
| ±40 | 2070 | $7.8 \times 10^{-6}$ |
| ±50 | 1230 | $-0.6 \times 10^{-6}$ |
| ±60 | 1010 | $-3.67 \times 10^{-6}$ |
| ±70 | 980 | $-2.5 \times 10^{-6}$ |
| ±80 | 990 | $-1 \times 10^{-6}$ |
| 90 | 1000 | 0 |

As understood from Table 1, the Young's modulus is greatly decreased as the orientation angle of the fiber is changed. In view of the practical commercial value of a molded article, especially a roll in which the length is much larger than the diameter, preferably flexion at the time of use is controlled as much as possible by increasing the Young's modulus in the axial direction as much as possible. Accordingly, the fiber winding angle of 0° is most preferred. Nevertheless, if the winding angle is within 0° to ±about 15°, the Young's modulus is not substantially lost and therefore, when winding is carried out by the filament winding method or the like, the fiber is often wound slightly obliquely on a mandrel.

The factors mentioned above with respect to the axial direction also hold good for the circumferential direction in a cylindrical molded article. The object of increasing the circular tube rigidity in the circumferential direction can be obtained by setting the circumferential winding angle of the fiber at 90° to ±75°. Accordingly, to ensure a high rigidity in the axial direction of this cylindrical molded article, in principle, the winding angle in the axial direction must be 0°±15° and the winding angle in the circumferential direction must be ±75° to 90°.

Nevertheless, as apparent from Table 1, the fiber is also has an extremely anisotropic linear expansion coefficient, and therefore, if the design of the lamination structure is not correct, a stretching stress acts in the radial direction in the interior of the molded article and cracking occurs therein. The amplitude of this internal stress and the positive or negative (compressive or stretching) aspects of the internal stress are determined by the Young's modulus and linear expansion coefficient based on the orientation angle of the fiber.

The present inventors investigated the influences of the orientation angle of the laminate, the orientation order and the thickness of each layer on the internal stress in the molded article and the precision of the molded article, and based on the results of this investigation, completed the present invention. More specifically, preferably, in the innermost layer of the molded article, the winding angle is 90° to ±75°, especially 90° to ±85°, to obtain an increased Young's modulus in the circumferential direction and reduce the linear expansion coefficient in the circumferential direction. In the inner layer, winding is performed in the axial direction, to maintain a required Young's modulus in the axial direction. In the outermost layer, the winding angle is set at 0° to ±35°, preferably 0° to ±25°, and to cause the internal stress to act as the contraction, the winding angle must be set so that the linear expansion coefficient in the circumferential direction is larger than or equal to the average linear expansion coefficient in the circumferential direction in layers other than the outermost layer. The above-mentioned conditions of the winding angles in the laminate are those for the three-layer structure, but it will readily be understood that, in a laminate having two layers or at least four layers, winding can be performed so that the foregoing conditions are satisfied.

Also in the multi-layer structure having at least four layers, conditions for causing the internal stress to act as the contraction can be calculated from the values of the Young's modulus and linear expansion coefficient. The winding angle in the innermost layer must be 90° to ±75° and the winding angle in the outermost layer must be 0° to ±35°.

The characteristic features of the roll of the present invention are not limited to those mentioned above. In the CFRP roll, the length is usually larger than the diameter, and it is very important that the weight should be reduced as much as possible. Accordingly, it is most important to reduce the thickness of the molded article and maintain the precision, especially the linear precision, at a high level. This, however, is very difficult. In general, where a very high precision is required for a cylindrical molded article, this high precision is obtained by machining, i.e., polishing, the peripheral portion. The inventors investigated this phenomenon, and as a result, succeeded in providing a molded article having the required properties. More specifically, it was found that not only the above-mentioned condition concerning the internal stress but also the condition that, in a CFRP roll, the linear expansion coefficient of the outermost layer is smaller than or equal to the average linear expansion coefficient in the axial direction of layers other than the outermost layer must be satisfied.

Generally, a roll is manufactured by applying a certain temperature for a certain time, regardless of whether the resin is a thermosetting resin or a thermoplastic resin. Since there is a difference between the temperature during molding and the temperature after molding, compressive or stretching stress acts in the interior of the molded article because of the difference of the linear expansion coefficient, and a product having a very high precision can be obtained by effectively utilizing this property.

More specifically, by making the linear expansion coefficient in the axial direction of the outermost layer smaller than the average linear expansion coefficient of layers other than the outermost layer, a compressive stress can be produced in the axial direction in the outermost layer of the molded article.

TABLE 2

| Fiber Orientation Angle (°) | Young's Modulus $E_L$ (kg/mm$^2$) | Linear Expansion Coefficient $\alpha_L$ (1/°C.) in Axial Direction | $E_L \cdot \alpha_L$ |
|---|---|---|---|
| 0 | 14400 | 0 | 0 |
| ±5 | 14200 | $-0.7 \times 10^{-6}$ | $-9.94 \times 10^{-3}$ |
| ±10 | 13200 | $-1 \times 10^{-6}$ | $-13.20 \times 10^{-3}$ |
| ±15 | 11530 | $-1.8 \times 10^{-6}$ | $-20.75 \times 10^{-3}$ |
| ±20 | 9210 | $-2.5 \times 10^{-6}$ | $-23.03 \times 10^{-3}$ |
| ±25 | 6700 | $-3.33 \times 10^{-6}$ | $-22.31 \times 10^{-3}$ |
| ±30 | 4550 | $-3.67 \times 10^{-6}$ | $-16.70 \times 10^{-3}$ |
| ±35 | 3020 | $-2.83 \times 10^{-6}$ | $-8.55 \times 10^{-3}$ |
| ±40 | 2070 | $-0.6 \times 10^{-6}$ | $-1.24 \times 10^{-3}$ |
| ±45 | 1520 | $3.33 \times 10^{-6}$ | $5.06 \times 10^{-3}$ |

Table 2 shows the fiber orientation angle, the Young's modulus in the axial direction, the linear expansion coefficient in the axial direction, and the product of the Young's modulus and linear expansion coefficient. As apparent from Table 2, if the fiber orientation angle is within 0° to ±40°, the product of the Young's modulus and the linear expansion coefficient is a negative value. If the average linear expansion coefficient or the product of the Young's modulus and the linear expansion coefficient in layers other than the outermost layer is larger than that of the outermost layer, a compressive stress acts in the axial direction in the outermost layer of the molded article. Accordingly, where the linearity of the as-formed molded article is impaired, if this molded article is polished, the side at which the compressive stress acts is mainly polished, and therefore, the compressive stress is released and the linearity of the molded article can be maintained. As apparent from Table 2, when the winding angle is ± about 20° the $E_L \cdot \alpha_L$ value is smallest, and therefore, as the means for obtaining a molded article having a large length/diameter ratio, a method in which a lamination of the winding angle of 0° to ±15° is carried out in the inner layer to increase the Young's modulus in the axial direction, the winding angle is adjusted to from ±75° to 90° in the innermost layer to increase the tube rigidity, and by combining these inner layer and innermost layer, the average linear expansion coefficient in the axial direction of these layers is made larger than the linear expansion coefficient in the axial direction of the outermost layer, is a rational method. Namely, by this method, a high rigidity in the axial direction, a high rigidity in the circumferential direction, and a high precision in the molded article can be simultaneously maintained. As apparent from Table 2, to improve the linear precision of the molded article, most preferably the fiber orientation angle of the outermost layer is ± about 20°.

The inventors investigated the surface treatment of a roll formed in the above-mentioned manner, and as a result, found that preferably a part or all of the peripheral surface of a roll, especially a roll rotated at a high speed, is covered with a metal plating structure comprising a layer of a conductive treating material having a thickness of 5 to 20 μm and composed of a conductive material such as silver powder and an epoxy resin or the like, a copper or nickel layer having a thickness of 200 to 500 μm, and a hard chromium or nickel plating layer having a thickness of 10 to 100 μm, which are arranged in this order from the inner side. It was found that, most preferably, a metal plating structure as shown in FIG. 3 is formed on the peripheral surface of a roll, particularly a roll rotated at a high speed.

Figure 3:
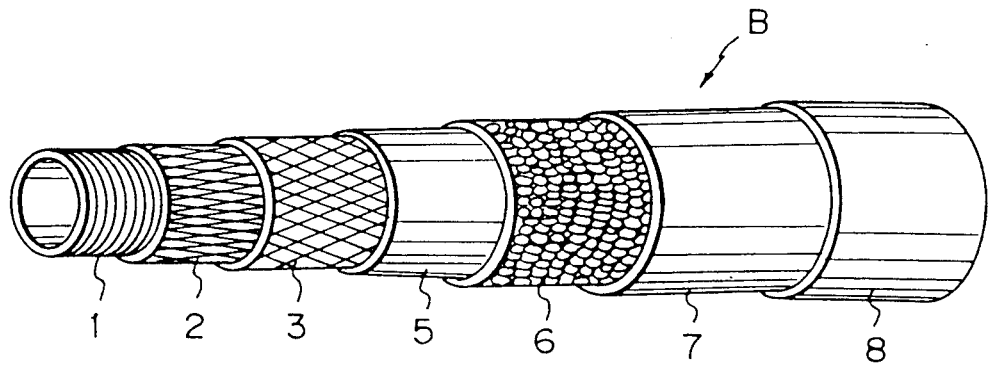
FIG. 3 is a partially broken elevational view showing another example of CFRP roll of the present invention, in which 1 and 3 represent inner and outer layers of the base tube of the carbon fiber composite material, 5 represents a surface treatment layer, 6 represents a metal flame spraying treatment layer, 7 represents an intermediate plating layer, 8 represents an outermost plating layer and B represents a roll shell.
Figure 4:
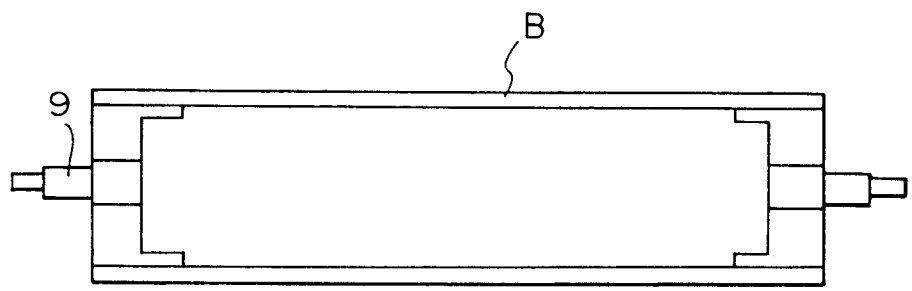
FIG. 4 is a sectional view of a roll shell B a superhigh speed rotating roll manufactured according to the present invention, in which 9 represents a journal.

Referring to FIG. 3, a surface treatment layer 5 for the flame spraying, a metal flame spraying treatment layer 6, an intermediate plating layer 7, and an outermost plating layer 8 are formed on the surface of a base tube composed of CFRP layers 1, 2, and 3, in this order from the inner side, whereby the adhesion between the metal flame spraying layer and CFRP as the base material is improved, and the same surface condition as that of a conventional metal roll can be obtained by plating the metal on the metal flame spraying layer.

In general, the metal flame spraying treatment layer is formed by jetting metal fine particles from a nozzle gun and fusion-bonding the particles to the base material. Accordingly, if this layer is polished, many micro-voids appear, and if chromium is plated on this layer, the micro-voids are not completely covered and in many cases, some pinholes are left on the surface. The inventors investigated this to eliminate these pinholes, and as a result, found that a method of forming an intermediate plating layer 7 between the metal flame spraying treatment layer 6 and the outermost plating player 8 for sealing effectively eliminates these pinholes.

The surface treatment layer 5 for the flame spraying is formed by incorporating a metal or inorganic powder having a special shape, such as a flat inorganic filler having a heat conductivity of at least 0.001 cal.cm$^{-1}$.sec$^{-1}$.deg$^{-1}$ and satisfying the condition of $\lambda \cdot S \geq 0.05$ in which $\lambda$ represents the heat conductivity and S represents the surface area expressed by unit m$^2$/g, or an inorganic filler having complicated convexities and concavities on the surface, into a thermosetting resin and coating and heat-curing the composition on the surface of CFRP. The metal or inorganic powders having a special shape are specifically described, for example, in U.S. Pat. No. 4,704,328: Any materials on which electric plating is possible, such as Cu, Ni, Al and Fe, can be used as the material of the metal flame spraying layer 6 without particular limitation. An appropriate material is selected for the intermediate plating layer in view of the sealing property and the corrosion resistance thereof. From the results of experiments, it was found that Cu or Ni is most preferable as the material of the intermediate plating layer 7. The material of the outermost plating layer 8 is appropriately selected according to the intended use, and Ni and Cr are generally adopted. If a high surface hardness is required, Cr plating is preferred.

It was found that, in case of the flame spraying of ceramics, the difference of the linear expansion coefficient between CFRP as a whole and the material to be flame-sprayed must not be too large, especially the linear expansion coefficient of CFRP must not greatly exceed the linear expansion coefficient of the material to be flame-sprayed. Also, the intended lamination structure can be obtained by fully utilizing the characteristic anisotropy of CFRP. More specifically, it was found that a preferable product can be obtained if the linear expansion coefficient of entire CFRP in the circumferential direction and axial direction is smaller than $10\times10^{-6}$ (1/°C.), especially smaller than $8\times10^{-6}$ (1/°C.). If the linear expansion coefficient is larger than the above-mentioned value, cracks are often formed in the ceramic portion under some flame spraying conditions.

In the present invention, a roll can be constructed by covering a part or all of the peripheral surface of the above-mentioned hollow cylindrical molded article with a metal tube, a ceramic tube, a rubber or a fluorine resin.

The importance of the present invention is that the consideration of the lamination structure for preventing cracking in the interior of the molded article described in detail hereinbefore and bending of the molded article, and the consideration of the entire linear expansion coefficient, are reconciled.

The carbon fiber can be a high-tenacity type, medium-elasticity type, or high-elasticity type, but a molded article having a higher rigidity can be obtained when a highly elastic carbon fiber is used. Furthermore, a high-tenacity carbon fiber, a medium-elasticity carbon fiber and a high-tenacity fiber can be used in combination.

The kind of the matrix resin is not particularly critical in the present invention. As typical examples, there can be mentioned thermosetting resins such as an epoxy resin, a phenolic resin, a polyester resin, a vinyl ester resin, a polyimide resin and a bismaleimide resin, and thermoplastic resins such as nylon 6, nylon 66, a polycarbonate resin, a polyethylene terephthalate resin, PEEK, PEK, PPS and PEI.

The molding method is not particularly critical, and as the typical molding method, there can be mentioned the filament winding method and the sheet wrapping method.

The present invention will now be described in detail with reference to the following examples, that by no means limit the scope of the invention.

EXAMPLE 1

A CFRP base tube having an inner diameter of 50 mm, an outer diameter of 57 mm, and a length of 2450 mm, i.e., a very large diameter length ratio, was prepared according to the filament winding method by using a high-tenacity type carbon fiber (Pyrofil ® T-1 supplied by Mitsubishi Rayon) as the carbon fiber and an epoxy resin as the matrix.

The periphery of the base tube was polished by a cylinder polishing machine so that the outer diameter was reduced to 56.34 mm. When the linearity was measured, it was found that the deflection was as small as 0.03 mm over the entire length and the linearity was excellent. The lamination structure after the periphery polishing was of 90°/±10°/±20° and 0.75 mm/1.9 mm/0.52 mm from the inner side. The stress in the radial direction was a compressive stress in each layer, and therefore, there was no fear of cracking in the interior of the molded article. The linear expansion coefficient in the axial direction of the outermost layer was $-2.5\times10^{-6}$ (1/°C.), and the product of the linear expansion coefficient and the Young's modulus in the axial direction in the outermost layer was $-23.03\times10^{-3}$ (kg/mm².°C.). The average linear expansion coefficient in the axial direction of the inner layer and innermost layer other than the outermost layer was $-0.033\times10^{-6}$ (1/°C.), which was larger than $-2.5\times10^{-6}$ (1/°C.). The product of the linear expansion coefficient in the axial direction and the Young's modulus in the axial direction in the inner layer and innermost layer was $-0.327\times10^{-3}$ (kg/mm².°C.), which was larger than the value of the outermost layer, i.e., $-23.03\times10^{-3}$ (kg/mm².°C.). Accordingly, it was found that the stress was a compressive stress in the axial direction in the outermost layer and a high linearity was expediently maintained at the polishing. The Young's modulus $E_L$ in the axial direction of the molded article was 9872 kg/mm². The specific modulus of the molded article was 2.46 times the specific modulus of aluminum, and accordingly, it was confirmed that a roll having a very light weight could be manufactured.

EXAMPLE 2

A film delivery roll having an inner diameter of 93 mm, an outer diameter of 100 mm, and a length of 2400 mm, and having a hard Cr plating layer formed on the surface was manufactured. The roll had a lamination structure comprising a CFRP layer, a copper plating layer, and this hard Cr plating layer arranged from the inner side. The copper plating layer was formed, as disclosed in Japanese Unexamined Patent Publication No. 61-194197, by coating an electroconductive resin composition comprising a silver powder and an epoxy resin on the periphery of CFRP, curing the resin composition to effect an electroconductive treatment on the surface of the cylinder, and electrolytically plating copper on the treated surface. Then, the copper-plated surface was polished and industrial hard Cr plating was performed by a customary method using chromic acid for the plating solution at a current density of 50 A/dm².

A high-tenacity type carbon fiber (Pyrofil ® T-1 supplied by Mitsubishi Rayon) was used as the carbon fiber, and the filament winding method was adopted for the molding.

An epoxy resin was used as the matrix. The lamination structure after the polishing of the periphery of CFRP was of 90°/±10°/±20° and 0.75 mm/2.0 mm/0.52 mm from the inner side. When the linear expansion coefficients in the circumferential direction were calculated from the data shown in Table 1, the average linear expansion coefficient in the circumferential direction of the second layer (±10° layer) and third layer (±20° layer) was $31.4\times10^{-6}$ (1/°C.), which was larger than the linear expansion coefficient innermost layer (90° layer), that is, 0 (1/°C.). The average linear expansion coefficient in the circumferential direction of the innermost layer (90° layer) and the second layer (±10° layer) was $5.13\times10^{-6}$ (1/°C.), which was smaller than the linear expansion coefficient of the outermost layer, that is, $28\times10^{-6}$ (1/°C.).

The stress in the radial direction in each layer was a compressive stress, and there was no risk of cracking in the interior of the molded article. The linear expansion coefficient in the axial direction of the outermost layer was $-2.5\times10^{-6}$ (1/°C.), and the product of the linear expansion coefficient in the axial direction and the Young's modulus in the axial direction in the outermost layer was $-23.03\times10^{-3}$ (kg/mm².°C.). The average linear expansion coefficient in the axial direction of the inner layer and innermost layer other than the outermost layer was $-0.033\times10^{-6}$ (1/°C.), which was larger than $-2.5\times10^{-6}$ (1/°C.). The product of the linear expansion coefficient in the axial direction and the Young's modulus in the axial direction in the inner layer and innermost layer was $-0.327\times10^{-3}$ (kg/mm².°C.)., which was larger than the value of the outermost layer, that is, $-23.03\times10^{-3}$ (kg/mm².°C.).

Accordingly, in the outermost layer, the stress was a compressive stress in the axial direction, and the reduction of the deflection at the polishing was rapid, and the deflection after the polishing of the molded article was 2/100 mm. Thus, it was confirmed that the precision was very high.

The Young's modulus $E_L$ in the axial direction of the molded article was about 9767 kg/mm$^2$, and the specific modulus of the molded article was 2.38 times the specific modulus of aluminum, and a roll having a very light weight could be manufactured.

EXAMPLE 3

A film delivery roll having an inner diameter of 90 mm, an outer diameter of 100 mm and a length of 2000 mm and having the surface flame-sprayed with a ceramics (Al$_2$O$_3$-40TiO$_2$) was prepared by using CFRP. The carbon fiber, matrix and molding method were the same as those as described in Example 2.

The lamination structure after the polishing of the periphery of CFRP was of 90°/±10°/±20° and 1.0 mm/3.0 mm/0.67 mm from the inner side. The stress in the radial direction in each layer was a compressive stress and there was no risk of cracking in the interior of the molded article. The linear expansion coefficient in the axial direction of the outermost layer was $-2.5 \times 10^{-6}$ (1/°C.) as in Example 2, and the product of the linear expansion coefficient in the axial direction and the Young's modulus in the axial direction in the outermost layer was $-23.03 \times 10^{-3}$ (kg/mm$^2$·°C.) as in Example 2.

The average linear expansion coefficient in the axial direction of the inner layer and innermost layer other than the outermost layer was $-0.138 \times 10^{-6}$ (1/°C.), which was larger than $-2.5 \times 10^{-6}$ (1/°C.).

The product of the linear expansion coefficient and the Young's modulus in the axial direction in the inner layer and innermost layer was $-1.40 \times 10^{-3}$ (kg/mm$^2$·°C.), which was larger than the value of the outermost layer, that is $-23.03 \times 10^{-3}$ (kg/mm$^2$·°C.). Accordingly, the stress was a compressive stress in the axial direction in the outermost layer, and the molded article was very advantageous in the linearity precision upon polishing.

The linear expansion coefficient in the axial direction of the entire molded article was $-0.45 \times 10^{-6}$ (1/°C.) and the linear expansion coefficient in the circumferential direction of the entire molded article was $6.34 \times 10^{-6}$ (1/°C.), and each of these values was smaller than $8 \times 10^{-6}$ (1/°C.). Accordingly, it was confirmed that cracking did not occur in the flame-sprayed portion and the formed roll was very good.

The deflection after the polish finishing was 2/100 mm, and the precision was very high.

The Young's modulus in the axial direction of the entire CFRP was 8834 kg/cm$^2$ and the specific modulus was 2.16 times the specific modulus of aluminum, and a roll having a very light weight could be manufactured.

EXAMPLE 4

In the present example, a super-high speed rotary roll having an inner diameter of 90 mm, an outer diameter of 100 mm and a length of 1000 mm and having a hard Cr plating formed on the surface was manufactured by using the hollow cylindrical molded article of the present invention. The lamination structure of this roll shell A from the inner side was as follows:
CFRP base tube: 4.65 mm
Thickness of surface treatment layer: 70 μm
Thickness of copper flame spraying treatment layer: 150 μm
Thickness of copper plating layer: 100 μm
Thickness of outermost Cr plating layer: 30 μm
The lamination structure of the CFRP tube from the inner side was as follows: 90°/±10°/±20°=1.0 mm/2.9 mm/0.75 mm Pyrofil® T-1 supplied by Mitsubishi Rayon was used as the carbon fiber and an epoxy resin was used as the matrix resin, and the base tube was prepared according the filament winder method.

The average linear expansion coefficient of the second layer (±10° layer) and third layer (±20° layer) of the base tube was $31.4 \times 10^{-6}$ (1/°C.), which was larger than the linear expansion coefficient of the innermost layer (90° layer), that is, 0 (1/°C.).

The average linear expansion coefficient in the circumferential direction of the innermost layer (90° layer) and second layer (±10° layer) was $5.56 \times 10^{-6}$ (1/°C.), which was smaller than the linear expansion coefficient of the outermost layer, that is, $28 \times 10^{-6}$ (1/°C.). Accordingly, the stress in the base tube was a compressive stress in the axial direction, and there was no risk of cracking in the interior. The linear expansion coefficient in the axial direction of the outermost layer was $-2.5 \times 10^{-6}$ (1/°C.) as in Example 2. The product of the linear expansion coefficient in the axial direction and the Young's modulus in the axial direction in the outermost layer was $-23.03 \times 10^{-3}$ (kg/mm$^2$·°C.) as in Example 2.

The average linear expansion coefficient in the axial direction of the inner layer and innermost layer other than the outermost layer was $-0.145 \times 10^{-6}$ (1/°C.), which was larger than $-2.5 \times 10^{-6}$ (1/°C.). The product of the linear expansion coefficient in the axial direction and the Young's modulus in the axial direction in the inner layer and innermost layer was $-1.47 \times 10^{-3}$ (kg/mm$^2$·°C.), which was larger than the value of the outermost layer, that is, $-23.03 \times 10^{-3}$ (kg/mm$^2$·°C.). Accordingly, the stress in the axial direction of the outermost layer was a compressive stress, and the linearity precision after the polishing of the base tube was very high. The average Young's modulus in the axial direction of the entire CFRP of the roll was 10007 kg/mm$^2$.

The steps of preparing this roll will now be described in succession. At first, the carbon fiber impregnated with the matrix resin was wound in due order from the inner side on an iron mandrel by using a filament winder and curing was affected under heating. The formed base tube was drawn out from the mandrel, and the surface of the base tube was polished. A surface treatment using an epoxy resin as the binder and carbonil nickel powder was carried out as the surface treatment for the flame spraying. Copper was flame-sprayed on the surface treatment layer by the plasma flame spraying method. The copper flame spraying treatment layer was polished and copper was plated on the copper flame spraying treatment layer. The copper plating layer was polished, and Cr was plated on the polished copper plating layer and final polishing was carried out to obtain a product. In the formed roll, no shaking occurred at a rotation speed of up to 25000 rpm, and the roll had a very good rotation performance.

No pinhole was found on the surface of the Cr plating, and the surface condition of the roll was very good.

Figure 5:
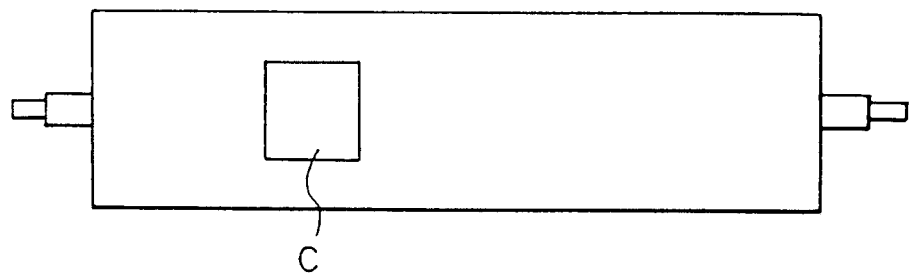
FIG. 5 is a plane view of a roll having rectangular groove C formed on the surface thereof for testing the adhesion strength of the surface treatment layer of the roll.

A square groove having a size of about 50 mm and about 50 mm was formed on the surface of the roll so that the carbon fiber base tube could be seen, as indicated by C in FIG. 5. When peeling of the copper flame-sprayed portion through this groove by a driver was tried, peeling was impossible because the copper flame-sprayed portion was bonded very tightly.

EXAMPLE 5

A paper-making roll having an inner diameter of 142 mm, an outer diameter of 150 mm and a length of 2000 mm, which was composed of CFRP as the base material and had the outer surface coated with a fluorine resin, was manufactured.

Pyrofil® MM-1 by Mitsubishi Rayon was used as the carbon fiber and an epoxy resin was used as the matrix resin. The average Young's modulus (E) in the axial direction was 10300 kg/mm².

The roll surface was formed by using a mixture of a tetrafluoroethylene/hexafluoropropylene copolymer and an epoxy resin as the binder. The roll was manufactured according to the following procedures. The carbon fiber impregnated with an epoxy resin was wound on an iron mandrel having an outer diameter of 142 mm by using a filament winder and curing was carried out under heating. The cured product was removed from the mandrel, cut into a predetermined length and polished by a cylinder polishing machine so that the outer diameter was 149.6 mm. A surface treatment layer having a thickness of 0.05 mm, which was composed of Ni powder and an epoxy resin, was formed on the surface of the obtained base tube for a roll, and after curing under heating, a fluorine resin was spray-coated on the surface treatment layer. The spray coating layer had a thickness of 0.05 mm. Baking was carried out at a temperature of 230° C. for 90 minutes in a heat-curing furnace.

A journal-equipped header was attached to the obtained fluorine resin-coated roll shell A by an adhesive to obtain a roll. The contact angle with water was measured, to examine the surface release characteristic, and it was found that the contact angle was 95° to 100° and the surface was non-tacky.

When the roll was used for lamination of paper and polyethylene, since the weight of the roll was light and the roll had an excellent release characteristic, winding of the treated laminate on the roll did not occur and the operating efficiency was highly improved.

COMPARATIVE EXAMPLE 1

A film delivery roll having an inner diameter of 93 mm, an outer diameter of 100 mm and length of 2400 mm and having a hard Cr plating formed on the surface was prepared by using CFRP.

The carbon fiber, matrix resin and the molding method were the same as described in Example 2. The lamination structure after the polishing of the periphery was 90°/±10°/90° and 0.4 mm/2.35 mm/0.52 mm from the inner side. The stress in the radial direction between the ±10° inner layer and 90° outer layer acts as a stretching stress, and cracking occurred between the ±10° layer and the 90° outermost layer.

The linear expansion coefficient in the axial direction of the outermost layer was $34 \times 10^{-6}$ (1/°C.), which was larger than the average linear expansion coefficient in the axial direction of the inner layer and innermost layer, that is, $-0.55 \times 10^{-6}$ (1/°C.). At the polishing of CFRP, bending of the molded article occurred, and a product having a required precision could not be manufactured.

COMPARATIVE EXAMPLE 2

A film delivery roll having an inner diameter of 63 mm, an outer diameter of 71.6 mm and a length of 1000 mm and having the surface flame-sprayed with a ceramic ($Al_2O_3$-4O$TiO_2$) was manufactured by using CFRP. The carbon fiber, matrix resin and molding method were the same as described in Example 2. The lamination structure was of 90°/±10°/±45°/±10° and 0.4 mm/ 1.7 mm/0.2 mm/1.7 mm. In the obtained molded article, the linear expansion coefficient in the circumferential direction was $11.6 \times 10^{-6}$ (1/°C.), but since the linear expansion coefficient in the circumferential direction was too large, cracking occurred in the flame-sprayed portion at the flame spraying, and a good product could not be manufactured.

As apparent from the foregoing description, according to the present invention, a roll having a lighter weight than the weight of a conventional metal roll is obtained, and therefore, scratching or like damage of a treated material (film) is prevented and the line speed is increased. Moreover, in the cylindrical molded article manufactured by the above-mentioned surface treatment method, the adhesion strength between the base material and the surface treatment layer is high, and the molded article is suitable as a super-high speed rotating roll or a machine part which undergoes friction or impact force. Moreover, since no pinholes are present on the surface, the molded article is suitable as a manufacturing roll required to have a high quality, for example, a magnetic tape-manufacturing roll.

We claim:

1. A roll formed of a carbon fiber composite material comprising:
    an outermost layer having a fiber-winding angle of 0° to ±35° to an axial direction of the roll;
    at least one layer other than the outermost layer, said at least one layer other than the outermost layer comprising an innermost layer having a fiber-winding angle of ±85° to 90° to the axial direction of the roll.

2. A roll as set forth in claim 1, wherein the linear expansion coefficient in the axial direction of the outermost layer is smaller than or equal to the average linear expansion coefficient int he axial direction of said at least one layer other than the outermost layer.

3. A roll as set forth in claim 1, wherein the linear expansion coefficient in the circumferential direction of the outermost layer is larger than or equal to the average linear expansion coefficient in the circumferential direction of said at least one layer other than the outermost layer.

4. A roll as set forth in claim 1, wherein the linear expansion coefficient of the roll in the circumferential direction is smaller than $8 \times 10^{-6}$ (1/°C.) and wherein the linear expansion coefficient of the roll in the axial direction is smaller than $8 \times 10^{-6}$ (1/°C.)

5. A roll as set forth in claim 1, wherein a part or all of the peripheral surface is covered with a metal plating layer.

6. A roll as set forth in claim 1, wherein a part or all of the peripheral surface is covered with a surface treatment layer for flame spraying, a metal flame spraying layer, an intermediate metal plating layer and an outermost metal plating layer, arranged in this order form the peripheral surface.

7. A roll as set forth in claim 1, wherein a part or all of the peripheral surface is covered with a metal tube.

8. A roll as set forth in claim 1, wherein a ceramic flame spraying layer is formed on the peripheral surface.

9. A roll as set forth in claim 1, wherein the peripheral surface is covered with a ceramic tube.

10. A roll as set forth in claim 1, wherein the peripheral surface is covered with a rubber.

11. A roll as set forth in claim 1, wherein the peripheral surface is covered with a fluorine resin.

* * * * *